United States Patent

Viene

[15] 3,653,420
[45] Apr. 4, 1972

[54] MEAT GRINDER

[72] Inventor: John G. Viene, Shawnee Mission, Kans.
[73] Assignee: Koch Supplies, Inc., Kansas City, Mo.
[22] Filed: Feb. 24, 1970
[21] Appl. No.: 13,459

[52] U.S. Cl. ............................................146/186, 146/79
[51] Int. Cl. ..................................B02c 18/22, B01f 15/02
[58] Field of Search..................146/181, 182, 186, 187, 188, 146/189, 79

[56] References Cited

UNITED STATES PATENTS

| | | | |
|---|---|---|---|
| 3,076,489 | 2/1963 | Schmidt et al. | 146/182 |
| 3,399,704 | 9/1968 | Otto | 146/182 |
| 3,450,180 | 6/1969 | Braun | 146/182 |
| 3,570,569 | 3/1971 | Hartley | 146/186 |

*Primary Examiner*—Willie G. Abercrombie
*Attorney*—Scofield, Kokjer, Scofield & Lowe

[57] ABSTRACT

A combination of a feeder mechanism and a high speed grinder with a grinder supporting frame hingedly mounted to a feeder supporting frame to swing outwardly therefrom on castor wheeled legs. A rotatable worm auger to move material from the container of the feeder mechanism to the high speed grinder has an extension received by a rotatable sleeve connected to the motor of the feeder mechanism. A locking pin having a spring loaded retainer ring connects the auger extension and rotatable sleeve. With the spring loaded retainer ring manually depressed, the locking pin can be removed, and with the grinder swung outwardly from the feeder mechanism, the worm auger can be pulled from the feed container through the tubular throat of the feeder mechanism.

7 Claims, 11 Drawing Figures

Patented April 4, 1972

INVENTOR
John G. Viene

BY
*Sinfield, Lohjen, Scofield & Lowe*
ATTORNEYS

Patented April 4, 1972

INVENTOR
John G. Viene

BY
ATTORNEYS

MEAT GRINDER

BACKGROUND OF THE INVENTION

Machines for grinding materials represent a specialized and widely practiced art affecting many products of public and private consumption. Of special importance are machines related to grinding foodstuffs and particularly meat products.

Many people are familiar with the meat grinder that can be clamped to the kitchen table. A certain amount of dexterity is required to simultaneously push meat with a tamper rod down through the receiver to a worm auger and turn the hand crank which rotates the auger and forces the meat into the grinder throat and out through a die or screen. Those familiar with this device will likewise be acquainted with the arduous cleaning chore resulting from use of the meat grinder.

In many respects, today's large commercial meat grinder is similar to the household variety except on a much larger scale. Disposed within a hopper-shaped container, a motor powered worm auger transports meat through a tubular throat in one end of the container to a smaller, high speed auger which forces the meat out through a foraminous plate. Needless to say, the task of cleaning these machines is proportional to their size.

At one time in our history, as evidenced by Upton Sinclair's novel, The Jungle, cleanliness was of little importance in the meat packing industry. However, today this industry must meet the most stringent sanitation and inspection requirements. For the meat grinding art, the social mandate for cleanliness has resulted in machinery designed utilizing stainless steel for parts in contact with the product and eliminating cracks and crevices where meat may be lodged to later spoil. On the other hand, from industry's standpoint there remains a need for a meat grinder which can be easily and quickly disassembled to facilitate cleaning and inspection.

SUMMARY OF THE INVENTION

The primary object of this invention is to provide a meat grinder of which can be easily and quickly disassembled for cleaning and inspection.

Another object of the invention is to provide a meat grinder with a feeder mechanism which includes a hopper shaped container, a tubular throat extended toward a high speed grinder, and a rotatable worm auger disposed within the container and throat to move material to the high speed grinder. During normal operation, the end of the tubular throat is disposed within the receiver of the high speed grinder and is retained therein by a single locking bolt. With the locking bolt removed, however, the grinder can be swung outwardly on castor wheeled legs of the grinder supporting frame which is hingedly mounted to the table like, feeder supporting frame.

An additional object of the invention is to provide a meat grinder of the character described which includes a safety switch to prevent operation of the high speed grinder when the same is swung outwardly from the feeder mechanism.

A further object of the invention is to provide a meat grinder of the character described and to provide unique locking means for connecting the rotatable worm auger to a motor of the feeder mechanism. A removable locking pin connects an extension of the work auger shaft to a rotatable sleeve associated with the motor and is held in place by a spring loaded retainer ring. With the spring loaded retainer ring manually depressed, access to and removal of the locking pin can be accomplished.

Yet another object of the invention is to provide a meat grinder of the character described in which the high speed grinder is operable to swing outwardly from the feeder mechanism and in which the rotatable worm auger is connected to the motor of the feeder mechanism by removable locking means. When the high speed grinder is swung outwardly and the locking means is removed, the worm auger can be easily pulled from the feeder mechanism through the tubular throat.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith and in which like reference numerals indicate like parts in the various views:

Referring to FIG. 2, a feeder mechanism 20 is shown operatively connected to a high speed grinder 21. The feeder mechanism 20 includes a hopper-shaped container 22 suitable for holding material to be ground and supported by a table-like frame 23. The bottom of the container 22 is formed by a semicircular trough 24, one end of which terminates in a tubular throat 25 extending from the end wall 26 of the container toward the high speed grinder 21. The opposite end of the trough 24 is closed by the end wall 27 of the container.

Figures 1, 2:
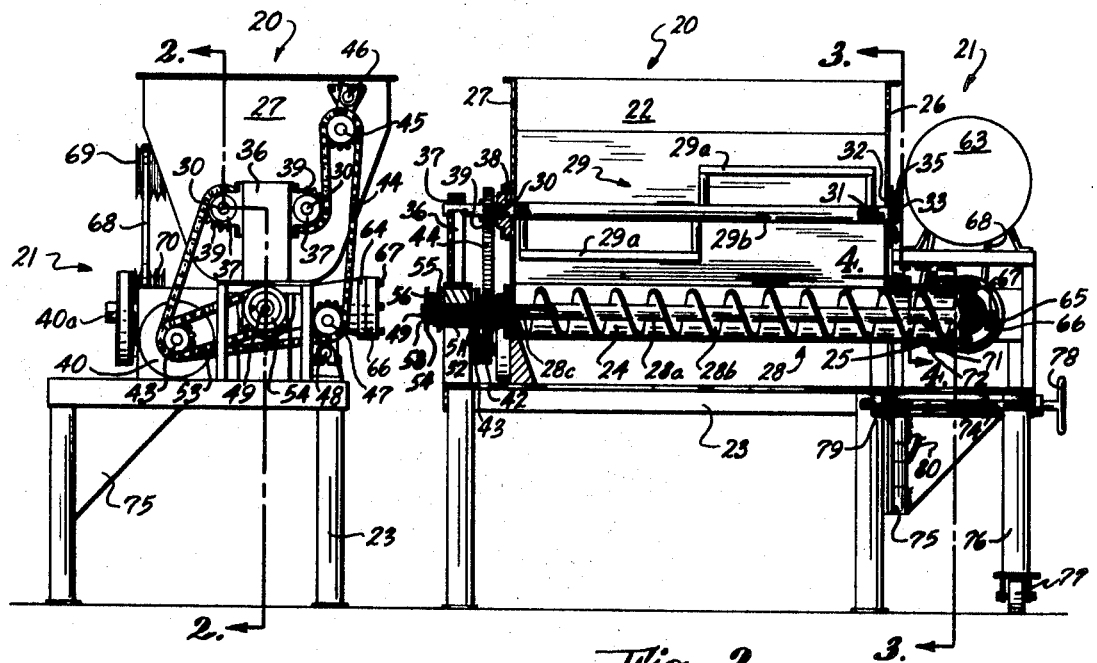
FIG. 1 is an end elevational view of a meat grinder constructed in accordance with a preferred embodiment of this invention.
FIG. 2 is a side sectional view along line 2—2 of FIG. 1 in the direction of the arrows.

Disposed within the container 22 in trough 24 and tubular throat 25 is a rotatable worm auger 28 formed as a tubular shaft 28a about which a spiral blade 28b, commonly known as flighting, is wrapped. The worm auger 28 is supported within the container 22 by the edge of the spiral blade 28b engaging the inner surfaces of the trough 24 and tubular throat 25.

Above the worm auger 28 are a plurality of paddle members 29 having paddle arms 29a attached to a tubular shaft 29b which is removably fitted to a rotatable shaft 30 extended through the end wall 27 of the container. At the opposite end of the container and above the tubular throat 25, a supporting rod 31 is extended through the end wall 26 to be received by the tubular paddle shaft 29b. Attached to the supporting rod 31 on the exterior of the container wall 26 is an inverted S-shaped bracket 32 having a finger loop 33. The bracket 32 is secured by bolts 34 extending from the container wall 26 through the openings of the bracket and by wing nuts 35 which engage the bracket and are tightened on bolts 34 to force the bracket against the exterior surface of the container wall.

Figure 3:
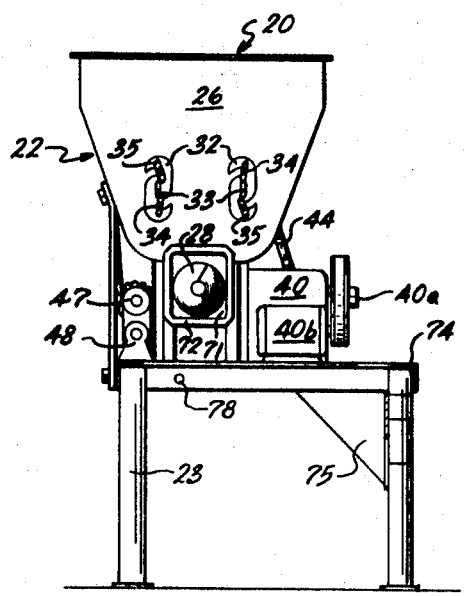
FIG. 3 is an end view of the feeder mechanism of the meat grinder generally along line 3—3 of FIG. 2 in the direction of the arrows.

By loosening the wing nuts 35, the inverted S-shaped bracket 32 can be rotated clockwise as viewed in FIG. 3 with the finger loop 33 and removed from the container, and thus withdrawing supporting rod 31 from the tubular shaft 29b. With the bracket 32 removed, the tubular shaft 29b can be slipped from the rotatable shaft 30, thereby allowing removal of paddle member 29 from the container 22.

Remote from the end wall 27 of the container, an upright, shaft supporting structure 36 is attached to the feeder supporting frame 23. Bearing members 37 are connected to the structure 36 and receive the rotatable shafts 30 which are supported at the container 22 by bearing blocks 38 attached on the exterior of end wall 27. Each rotatable shaft 30 is fitted with a sprocket wheel 39 located between the bearing member 37 and the bearing block 38.

As best viewed in FIG. 1 the gear box 40, driven by a feeder motor 40b connected to the input shaft 40a, has a driven shaft 41 extended therefrom fitted with an inner and outer sprocket drive wheel 42 and 43, respectively. The inner sprocket drive wheel 42 which is closest to the gear box 40 drives an endless chain 44 communicating around the sprocket wheels 39 of the rotatable shafts 30 connected to the paddle members 29, an idler sprocket wheel 45 mounted on the exterior of end wall 27 by an adjustable mount 46, and an idler sprocket wheel 47 mounted to the feeder supporting frame 23 by an adjustable mount 48. The adjustable mounts 46 and 48 allow positioning of the respective idler sprocket wheels 45 and 47 to supply the necessary tension and to guide the endless chain 44.

As viewed in FIG. 1, all shafts and sprocket wheels rotate in a clockwise direction with the exception of the right hand rotatable shaft 30 and sprocket wheel 39, which rotate in a counterclockwise direction. In other words, the paddle members 29 connected to rotatable shaft 30 are caused to rotate in such a fashion that material in the container 22 above the paddle members 29 will tend to be moved inwardly toward the center of the container and downwardly toward the worm auger 28.

At the end of the container 22 opposite the tubular throat 25, the auger shaft 28 is fitted with an extension 28c which passes through the end wall 27 and is received within a rotatable sleeve 49. The sleeve 49 is supported by a bearing block 50 attached to the container wall and by a bearing mount 51 connected to the shaft supporting structure 36. Between the bearing block 50 and the bearing mount 51, a sprocket wheel 52 is attached to the rotatable sleeve 49 and is operatively connected to the outer sprocket drive wheel 43 of the gear box 40 by an endless chain 53.

One end of the rotatable sleeve 49 abuts the auger shaft 28a within the bearing block 50 attached to the container wall. A hub 54 having a rear flange 55 is attached to the other end of the sleeve 49 which extends outwardly past the bearing mount 51.

A radial hole extends through the hub 54 and sleeve 49 and is aligned with a hole in the auger shaft extension 28c to receive an L-shaped locking pin 56. This connection provides rotation of the worm auger 28 in conjunction with rotation of the sleeve 49 powered by the endless chain 53 communicating around the outer sprocket drive wheel 43 and the sleeve sprocket wheel 52.

Figure 8:
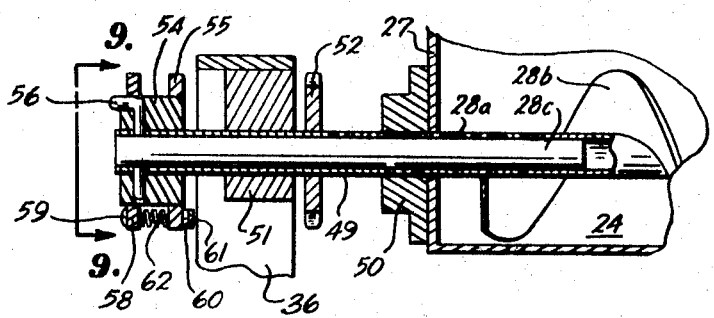
FIG. 8 is an enlarged sectional view of a portion of FIG. 2.
Figure 9:
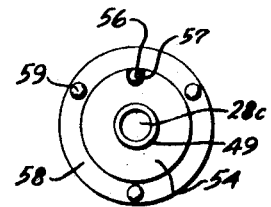
FIG. 9 is an end view along line 9—9 of FIG. 8 in the direction of the arrows.

As best viewed in FIGS. 8 and 9, the shortest leg of the locking pin 56 is disposed within a recess 57 in the peripheral surface of the hub 54 to allow a retainer ring 58 to be slidably fitted around the hub. The retainer ring 58 is connected to the flange 55 of the hub by a plurality of bolts 59. Each bolt 59 is attached to the retainer ring 58, passes through the flange 55, and is engaged by a nut 60 which is tightened against a locking nut 61 to prevent either nut 60 or 61 from threadably turning on the bolt 59. Disposed on each bolt 59 between the flange 55 and the retainer ring 58 is a helical spring 62 which normally repells the retainer ring 58 from the flange 55 until the nuts 60 engage the rear surface of the flange 55. In this position, the retainer ring 58 partially covers the locking pin 56 and prevents removal of the same.

Figure 10:
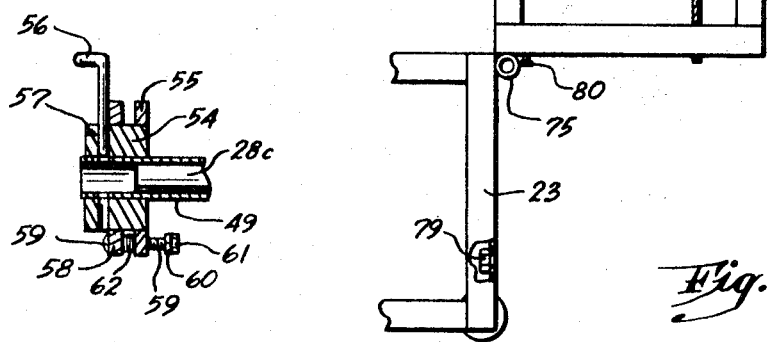
FIG. 10 is a sectional view of a portion of FIG. 9 with certain members shown partly withdrawn from the structure.

The retainer ring 58 can be manually depressed on the hub 54 toward the flange 55, as in FIG. 10, causing the nuts 60 and 61 and a portion of the bolts 59 to extend beyond the rear surface of the flange 55 and the helical spring 62 to be compressed between the retainer ring 58 and the flange 55. In this position, the locking pin 56 can be withdrawn from the auger shaft extension 28c, rotatable sleeve 49, and hub 54.

As previously mentioned, the tubular throat 25 extends outwardly from the container 22 toward the high speed grinder 21 now to be described. The grinder 21 includes a motor 63 which is operable to rotate a grinder auger (not shown) contained within a tubular chamber 64 to force meat through the chamber 64 and out a foraminous plate 65 secured to the end of the chamber 64 by a keeper ring 66 and a plurality of bolts 67. The grinder auger is driven by an endless belt 68 communicating around the pulley drum 69 connected to the motor 63 and the auger pulley drum 70.

Figures 4, 5:
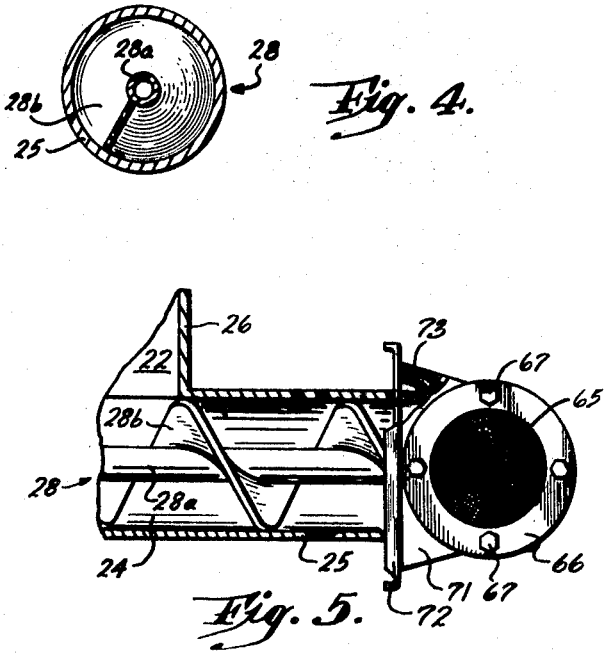
FIG. 4 is an enlarged sectional view along line 4—4 of FIG. 2 in the direction of the arrows.
FIG. 5 is an enlarged fragmentary view of a portion of FIG. 2.
Figures 6, 7:
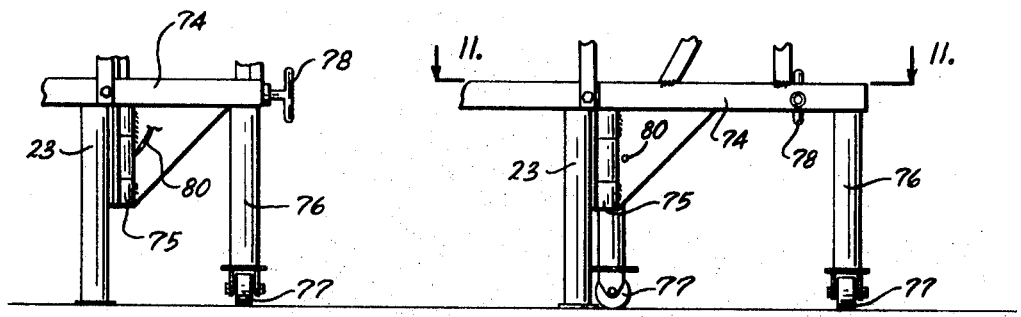
FIG. 6 is a fragmentary view of portions of the feeder supporting frame and of the grinder supporting frame.
FIG. 7 is a fragmentary view of the grinder supporting frame swung outwardly from the feeder supporting frame.

The tubular chamber 64 is positioned approximately perpendicular to the tubular throat 25 and has a hopper-shaped receiver 71 providing access to the interior of the chamber. As best viewed in FIG. 5, near the outermost end of the tubular throat 25 is attached a circumferential lip 72 having a delivery member 73 with inwardly sloped sides operable to mate in engaging fashion with the interior surfaces of the receiver 71.

The members of the high speed grinder 21 previously described are mounted on a grinder supporting frame 74 swingably connected on one side to the feeder supporting frame 23 by a triangular plate hinge 75. The grinder supporting frame 74 includes a plurality of legs 76 terminating in ground engaging castor wheels 77.

Figure 11:
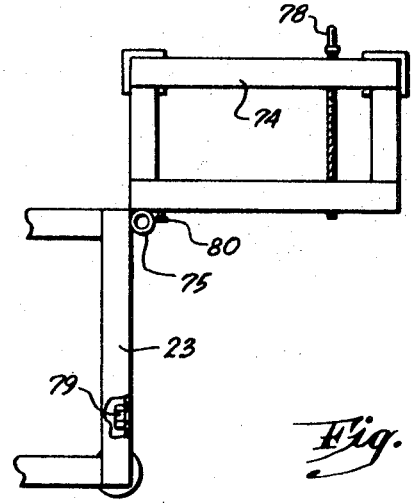
FIG. 11 is a plan view along line 11—11 of FIG. 7 in the direction of the arrows.

An elongated T-bolt 78 extends through the grinder supporting frame 74 and is threadably received by a large nut 79 attached to the feeder supporting frame 23. With the T-bolt 78 unthreaded from the nut 79, the high speed grinder 21 supported on grinder frame 74 can be swung outwardly, as viewed in FIG. 11, on the hinge 75 from the feeder mechanism 20 supported by the feeder frame 23.

The grinder supporting frame 74 also includes a plunger-type safety switch 80 associated with the hinge 75 to prevent operation of the grinder motor 63 when the high speed grinder 21 is swung outwardly from the feeder mechanism 20.

In operation, the meat grinder is utilized in the manner to be described.

Meat to be ground is placed in the hopper-shaped container 22 where rotation of the paddle members 29 mixes the meat and forces it downwardly toward the rotating worm auger 28 disposed within the semi-circular trough 24. The meat is then transported by the spiral blade 28b through the tubular throat 25 to the high speed grinder 21. The worm auger 28 delivers the meat to the receiver 71 and forces it into the tubular chamber 64 where the meat is picked up by the rotating grinder auger and forced outwardly through the foraminous plate 65.

Assuming that the meat grinder has been in use, the following procedure can be employed to facilitate cleaning.

With the T-bolt 78 unthreaded from its associated nut 79, the high speed grinder 21 is swung outwardly from the feeder mechanism 20 on the grinder supporting frame 74 hingedly mounted to the feeder supporting frame 23. Next, the retainer ring 58 is depressed on the hub 54 and the locking pin 56 is removed. With this accomplished the auger extension 28c is no longer connected to the rotatable sleeve 49 and the worm auger 28 is manually pulled from the container 22 through the tubular throat 25.

Likewise, the paddle members 29 are removed from the container 22 by disconnecting and removing the inverted S-shaped brackets 32.

With the feeder mechanism so disassembled, the members in prior contact with the meat including the container 22 can be easily and thoroughly cleansed. The meat grinder is reassembled by performing in reverse the steps described to disassemble.

Judging from the brief description necessary to illustrate the disassembly process, one can easily appreciate the speed with which the meat grinder can be disassembled for cleaning and inspection. Therefore, this invention fulfills a need long desired by the meat grinding industry.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In combination, a grinder mechanism and a feeder mechanism, the latter said mechanism comprising:
   a container suitable for holding material to be fed to said grinder mechanism;
   a tubular throat extending from side of said container towards said grinder mechanism,
   a rotatable worm auger including an elongated shaft and a blade spirally wrapped about said shaft disposed within said container and said throat, said auger operable when rotated to transport material from said container through said throat to said grinder mechanism,
   an extension of said shaft projecting through the side of said container opposite said throat,
   a rotatable sleeve on the outside of said container and in which said extension is received,
   power means for rotating said sleeve,
   removable lock means connecting said sleeve to said extension to allow said extension to rotate in conjunction with said sleeve acted upon by said power means, and
   slidable retainer means associated with said extension, rotatable sleeve and lock means, said retainer means operable to normally prevent removal of said lock means from said sleeve and extension but, when slidably depressed, operable to permit said lock means to be withdrawn from said extension and said sleeve.

2. A combination as in claim 1, said lock means including a locking pin removably fitted through said rotatable sleeve and said extension.

3. A combination as in claim 1, said retainer means including a spring loaded retainer ring slidably connected to said rotatable sleeve and operable to prevent removal of said lock means except when manually depressed on said sleeve.

4. In combination,
   a grinder mechanism;
   a feeder mechanism including a container suitable for holding material to be fed to said grinder mechanism, a tubular throat extending from one side of said container toward said grinder mechanism, and a rotatable worm auger disposed within said container and throat in longitudinal alignment with said grinder mechanism and having an elongate shaft with a blade spirally wrapped thereabout whereby material in said container is transported to said grinder mechanism by rotation of said auger;
   a table-like, feeder supporting frame on which said feeder mechanism is mounted; and
   a grinder supporting frame on which said grinder mechanism is mounted, said grinder supporting frame hingedly connected to said feeder supporting frame to arcuately swing out from said feeder mechanism through an angle of at least 90 degrees whereby to disengage said grinder mechanism from said feeder mechanism and remove said grinder mechanism from longitudinal alignment with said auger to permit withdrawal of said auger through the throat of said container.

5. A combination as in claim 1, said grinder supporting frame including a plurality of legs having castor wheels operable to roll in ground engaging fashion when said grinder supporting frame is swung outwardly from said feeder supporting frame.

6. A combination as in claim 1, including disconnectable locking means associated with said supporting frame to normally prevent said grinder supporting frame from swinging outwardly from said feeder supporting frame.

7. A combination as in claim 1, wherein said grinder mechanism includes power means and said grinder supporting frame includes a safety lock to prevent operation of said power means when said grinder supporting frame is swung outwardly from said feeder supporting frame.

* * * * *